United States Patent
Liang et al.

(10) Patent No.: US 10,333,345 B2
(45) Date of Patent: Jun. 25, 2019

(54) ENERGY STORAGE DEVICE AND ENERGY MANAGEMENT METHOD CAPABLE OF INCREASING STABILITY OF ENERGY SUPPLY

(71) Applicant: Wistron Corporation, New Taipei (TW)

(72) Inventors: Chen-Yi Liang, New Taipei (TW); Yung-Chen Chang, New Taipei (TW)

(73) Assignee: Wistron Corporation, New Taipei (TW)

(*) Notice: Subject to any disclaimer, the term of this patent is extended or adjusted under 35 U.S.C. 154(b) by 267 days.

(21) Appl. No.: 15/372,351

(22) Filed: Dec. 7, 2016

(65) Prior Publication Data

US 2018/0076660 A1     Mar. 15, 2018

(30) Foreign Application Priority Data

Sep. 10, 2016 (TW) ............... 105129463 A

(51) Int. Cl.
*H02J 9/06* (2006.01)
*H02J 7/00* (2006.01)

(52) U.S. Cl.
CPC ............ *H02J 9/066* (2013.01); *H02J 7/0068* (2013.01)

(58) Field of Classification Search
CPC ............................... H02J 9/066; H02J 7/0068
See application file for complete search history.

(56) References Cited

U.S. PATENT DOCUMENTS

| | | | | |
|---|---|---|---|---|
| 6,319,053 B1* | 11/2001 | Andrews | ............ | H01M 2/1022 320/112 |
| 6,806,681 B1* | 10/2004 | Cheiky | ............ | G03B 7/26 320/107 |
| 8,154,244 B1* | 4/2012 | Gorham | ............ | H01M 10/441 320/103 |
| 2012/0274279 A1* | 11/2012 | Banos | ............ | H02J 7/0021 320/112 |
| 2012/0274280 A1* | 11/2012 | Yip | ............ | H02J 7/0014 320/112 |
| 2015/0194844 A1* | 7/2015 | Jin | ............ | H02J 7/34 307/23 |

FOREIGN PATENT DOCUMENTS

| TW | 490909 | 6/2002 |
|---|---|---|
| TW | 200516825 | 5/2005 |

* cited by examiner

*Primary Examiner* — Jared Fureman
*Assistant Examiner* — Michael J Warmflash
(74) *Attorney, Agent, or Firm* — Winston Hsu

(57) ABSTRACT

An energy management method capable of increasing stability of energy supply is applied to an energy storage device. The energy storage device includes a casing, an energy storage unit, an electronic latching component and a control unit. The energy storage unit is detachably disposed inside the casing. A constraining structure is disposed on an outer surface of the energy storage unit. The electronic latching component is disposed on the casing. The control unit is electrically connected to the energy storage unit and the electronic latching component. The control unit detects storage capacity of the energy storage unit, compares the storage capacity with a threshold, and determines whether to engage the electronic latching component with the constraining structure in accordance with a comparison result, so as to constrain a movement of the energy storage unit relative to the casing.

18 Claims, 9 Drawing Sheets

ENERGY STORAGE DEVICE AND ENERGY MANAGEMENT METHOD CAPABLE OF INCREASING STABILITY OF ENERGY SUPPLY

BACKGROUND OF THE INVENTION

1. Field of the Invention

The present invention relates to an energy storage device and a related energy management method, and more particularly, to an energy storage device and an energy management method capable of increasing stability of energy supply.

2. Description of the Prior Art

With the advance technology, the portable electronic device with lots of added functions has a drawback of violent energy consumption, and the portable electronic device should provide preferred standby period for enhancement of market competition. The conventional portable electronic device, such as the mobile phone or the tablet computer, may increase energy capacity of the battery or execute energy saving program by software to economize the energy consumption. In addition, the virtual reality device (VR) or the augmented reality device (AR) becomes popular product, and the virtual reality device and the augmented reality device result in usage inconvenience because the VR/AR device cannot be charged by the physical transmission cable while the said device in use is carried to arbitrarily move around. The replaceable battery is applied to extend the standby period of the VR/AR device; however, storage capacity of the replaceable battery is limited and the replaceable battery is removed from the conventional energy supply module while the VR/AR device is shut down. Further, the conventional replaceable battery is disassembled from the energy supply module by manual operation of a mechanical latching button, and the manual operation of a mechanical latching button easily makes accidental supply interruption of the replaceable battery due to incorrect manipulation, so as to decrease stability of software and hardware operation about the related electronic device. Thus, design of an energy supply module or an energy storing device capable of contentiously supplying energy without shutting down system operation and preventing energy supply interruption by incorrect manipulation is an important issue in the related industry.

SUMMARY OF THE INVENTION

The present invention provides an energy storage device and an energy management method capable of increasing stability of energy supply for solving above drawbacks.

According to the claimed invention, an energy storage device capable of increasing stability of energy supply includes a casing, at least one energy storage unit, at least one electronic latching component and a control unit. The casing has an accommodating slot. The energy storage unit is detachably disposed inside the accommodating slot, and a constraining structure is disposed on an outer surface of the energy storage unit. The electronic latching component is disposed on a side of the accommodating slot. The control unit is electrically connected to the energy storage unit and the electronic latching component. The control unit detects storage capacity of the energy storage unit, compares the storage capacity with a threshold, and determines whether to engage the electronic latching component with the constraining structure in accordance with a comparison result, so as to constrain a movement of the energy storage unit relative to the casing.

According to the claimed invention, the energy storage device further includes at least one resilient component disposed inside the accommodating slot, an end of the resilient component is connected to the casing, and the other end of the resilient component contacts against the energy storage unit to provide potential energy of rejecting the energy storage unit out of the accommodating slot. The energy storage device further includes at least one mechanical latching component disposed on a side of the accommodating slot and applied to interfere with a blocking structure of the energy storage unit, a movement of the energy storage unit relative to the accommodating slot is constrained by the mechanical latching component while the electronic latching component is disengaged from the constraining structure, and the mechanical latching component is disengaged from the blocking structure by manual operation to allow a movement and separation of the energy storage unit relative to the accommodating slot. The energy storage device further includes at least one recovering component disposed on the mechanical latching component and applied to generate potential energy of pushing the mechanical latching component to interfere with the blocking structure.

According to the claimed invention, an energy management method is capable of increasing stability of energy supply. The energy management method is applied to an energy storage device having at least one energy storage unit and at least one electronic latching component, the energy storage unit is detachably disposed inside an accommodating slot of the energy storage device, the energy storage unit is constrained by the electronic latching component. The energy management method includes steps of detecting storage capacity of the energy storage unit, comparing the storage capacity with a threshold, and switching the energy storage unit from an energy supply mode to an energy blackout mode and driving the electronic latching component to disengage from a constraining structure of the energy storage unit while the storage capacity is lower than the threshold.

The energy storage device of the present invention utilizes the control unit to detect and analyze the storage capacity of the energy storage unit. The electronic latching component is engaged with the energy storage unit to prevent the energy storage unit from accidental failure during energy supply process while the storage capacity is greater than the predetermined threshold. The electronic latching component is disengaged from the energy storage unit while the storage capacity is lower than the predetermined threshold, and the constraint of the mechanical latching component has to be manually released to push the energy storage unit partly out of the casing via the resilient component. The electronic latching component can be the unidirectional electromagnetic valve or the bidirectional electromagnetic valve, standards and arrangement of the electronic latching component are set in accordance with an integral structural design of the energy storage device. The mechanical latching component is the auxiliary component optionally disposed by the energy storage unit; the mechanical latching component is manipulated to separate the energy storage unit from the casing since constraint mechanism of the electronic latching component is released, to effectively avoid the energy storage unit from being separated while being charged or supplying the energy.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
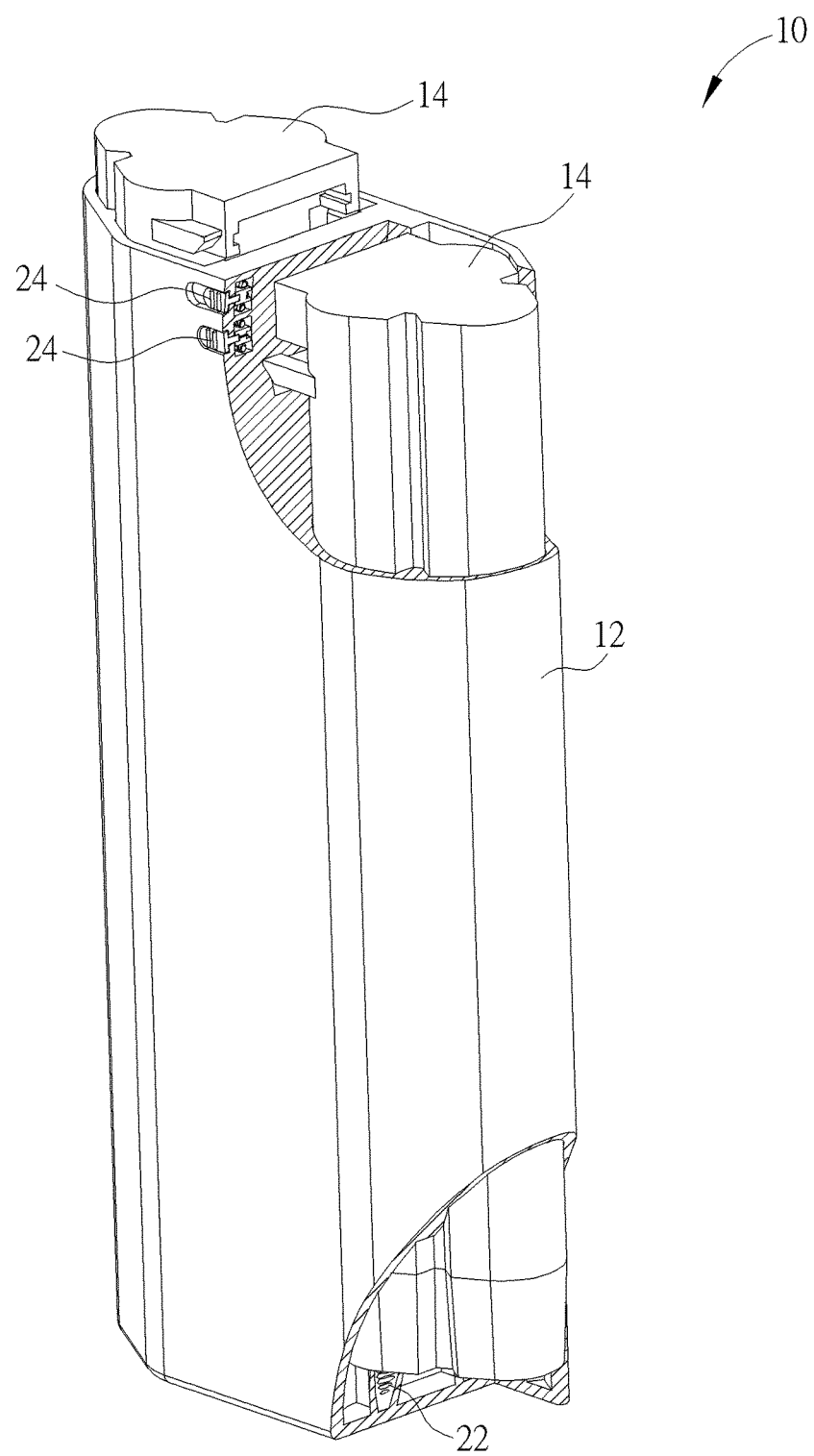
FIG. 1 is a diagram of an energy storage device according to an embodiment of the present invention.
Figure 2:
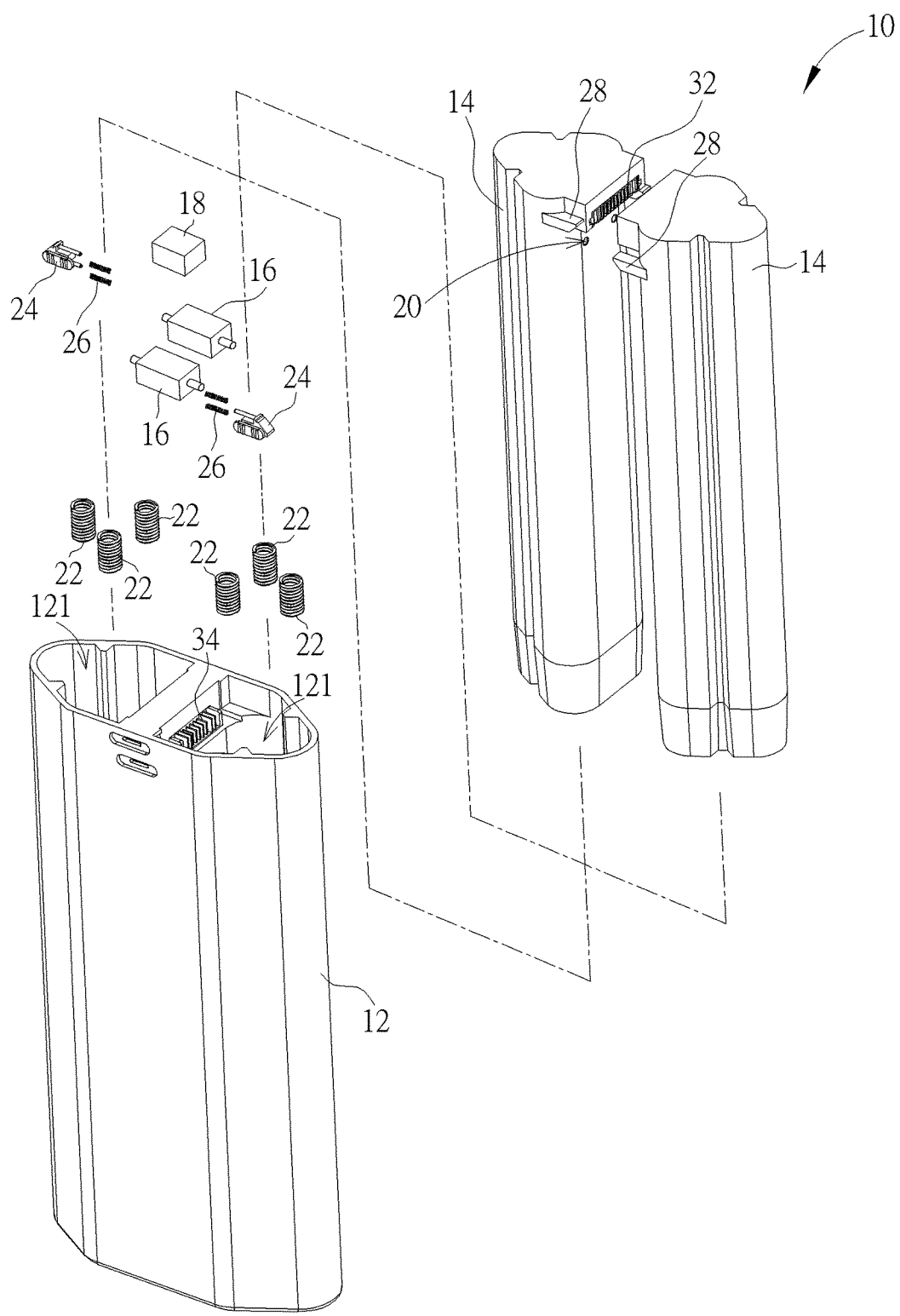
FIG. 2 is an exploded diagram of the energy storage device according to the embodiment of the present invention.
Figure 3:
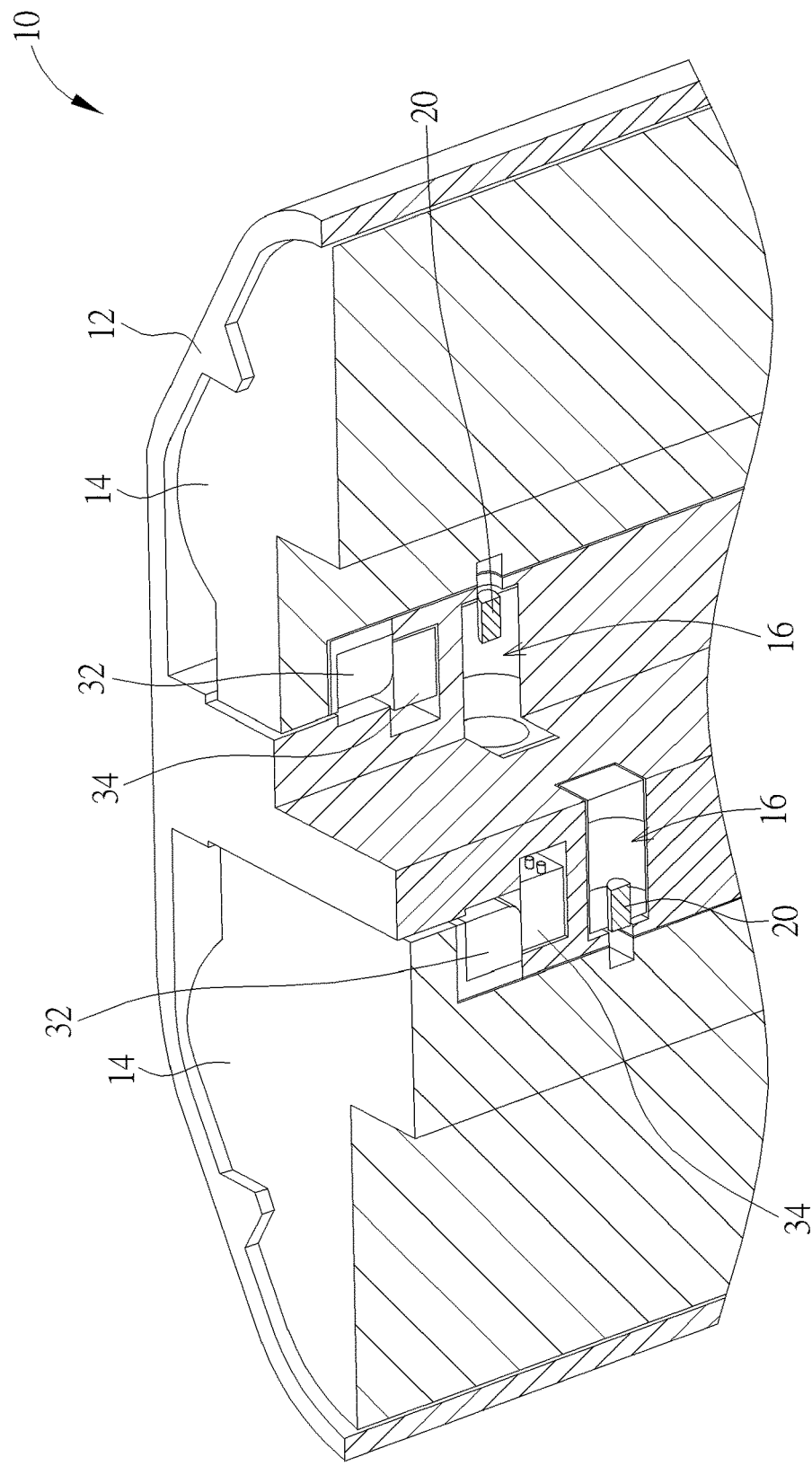
FIG. 3 and FIG. 4 respectively are sectional views of the energy storage device according to the embodiment of the present invention.
Figure 4:
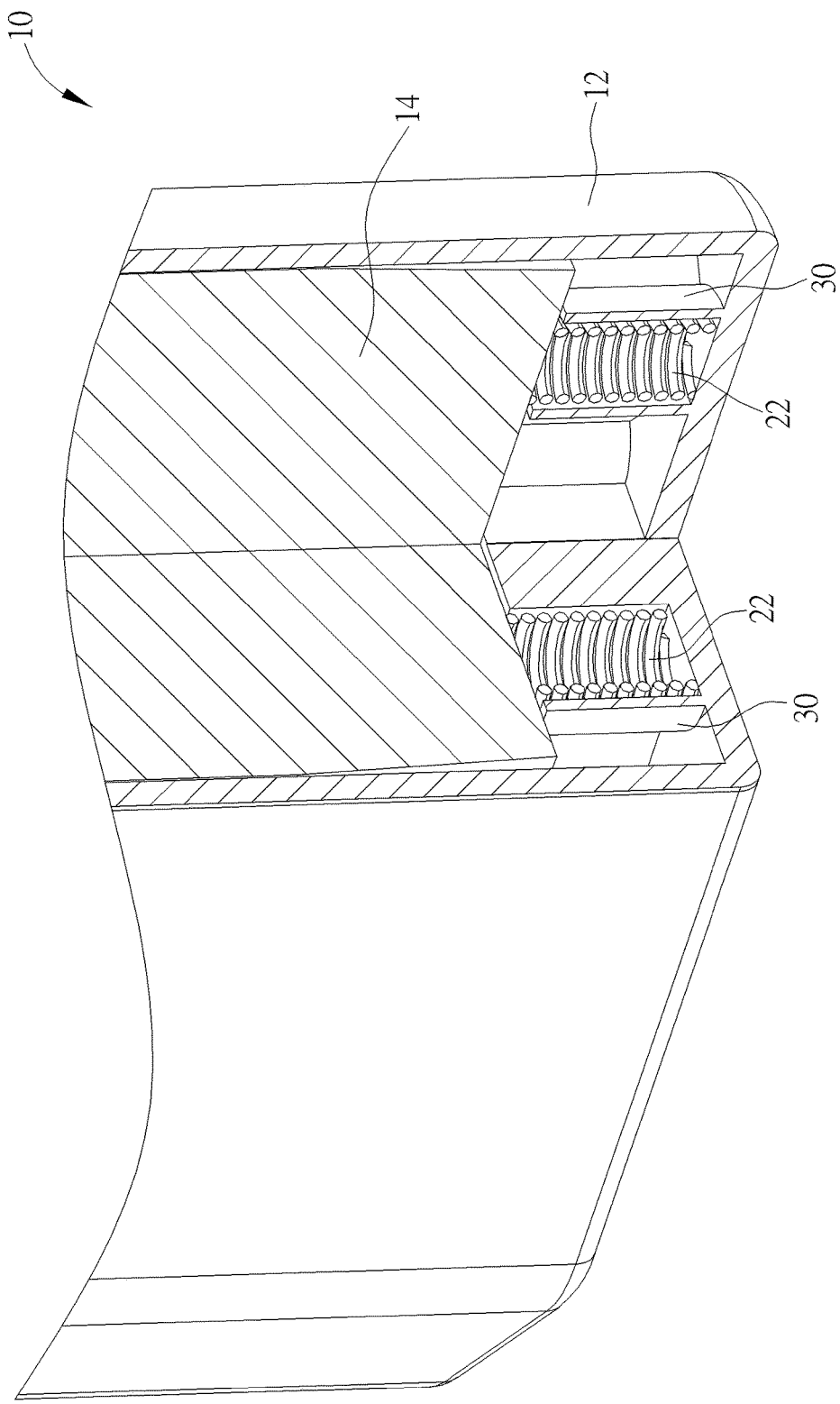

Please refer to FIG. 1 to FIG. 4. FIG. 1 is a diagram of an energy storage device 10 according to an embodiment of the present invention. FIG. 2 is an exploded diagram of the energy storage device 10 according to the embodiment of the present invention. FIG. 3 and FIG. 4 respectively are sectional views of the energy storage device 10 according to the embodiment of the present invention. The energy storage device 10 includes a casing 12, an energy storage unit 14, an electronic latching component 16 and a control unit 18. The energy storage unit 14 is detachably disposed inside an accommodating slot 121 of the casing 12. The electronic latching component 16 is disposed on a side of the accommodating slot 121 and aligns with a constraining structure 20 disposed on an outer surface of the energy storage unit 14. The constraining structure 20 can be a hole structure, and the electronic latching component 16 can movably insert into the hole structure for engagement. The electronic latching component 16 can be an electromagnetic valve. The control unit 18 is electrically connected to the energy storage unit 14 and the electronic latching component 16. The energy storage device 10 is utilized to provide energy to a portable electronic apparatus with the energy storage device 10. The energy storage unit 14 inside the energy storage device 10 can be replaced in accordance with user's demand. Motion range of the portable electronic apparatus is not limited by length of a physical transmission cable, which means the portable electronic apparatus can be carried to any place and contentiously keep in an operation mode.

In the embodiment of the present invention, the control unit 18 detects storage capacity of the energy storage unit 14, and compares the storage capacity with a predetermined threshold to accordingly activate or shut down the electronic latching component 16. While the storage capacity is greater than the threshold, the energy stored inside the energy storage unit 14 is sufficient for a requirement of the portable electronic apparatus, the electronic latching component 16 is engaged with the constraining structure 20 by the control unit 18, a movement of the energy storage unit 14 inside the accommodating slot 121 is constrained, so as to avoid energy supply of the energy storage unit 14 from accident interruption, and the energy storage unit 14 can continuously provide energy to the portable electronic apparatus, as the right-side electronic latching component 16 shown in FIG. 3. Further, while the storage capacity is lower than the threshold, the energy stored inside the energy storage unit 14 is not sufficient for the requirement of the portable electronic apparatus, so that the control unit 18 drives the electronic latching component 16 to disengage from the constraining structure 20, and the energy storage unit 14 can be manually removed from accommodating slot 121 for replacement, as the left-side electronic latching component 16 shown in FIG. 3.

In addition, a resilient component 22 can be optionally disposed inside the accommodating slot 121. An end of the resilient component 22 is disposed on an inner bottom surface of the accommodating slot 121, and the other end of the resilient component 22 detachably contacts against the energy storage unit 14, as shown in FIG. 1 and FIG. 4. A tube structure 30 can be disposed on the bottom of the accommodating slot 121. The resilient component 22 is preferably disposed inside the tube structure 30 to constrain unexpected deformation of the resilient component 22 and to prevent the resilient component 22 from separation. While the electronic latching component 16 is disengaged from the constraining structure 20, a resilient recovering force of the resilient component 22 pushes the energy storage unit 14 slightly out of the accommodating slot 121, as the left-side energy storage unit 14 shown in FIG. 1, and the energy storage unit 14 (which can be represented as a battery) can be replaced easily.

The embodiment of the present invention has two energy storage units 14; however an actual amount of the energy storage unit 14 is not limited to the above-mentioned embodiment. The energy storage device 10 includes at least one energy storage unit 14, and the amount of the energy storage unit 14 depends on total storage capacity of the energy storage device 10. Since the energy storage device 10 has one energy storage unit 14, the control unit 18 detects the storage capacity of the energy storage unit 14 to determine whether the electronic latching component 16 is engaged with the constraining structure 20. Since the energy storage device 10 includes a plurality of energy storage units 14 (such as the first energy storage unit and the second energy storage unit), the control unit 18 utilizes the main energy storage unit 14 to provide the energy to the portable electronic apparatus, and may drive the auxiliary energy storage unit to charge the main energy storage unit 14 while the main energy storage unit 14 is exhausted (the auxiliary energy storage unit 14 can be removed for replacement while the main energy storage unit 14 is fully charged), or the control unit 18 may stop energy supply of the main energy storage unit 14 (the main energy storage unit 14 can be removed for replacement) and further drive the auxiliary energy storage unit 14 to provide the energy to the portable electronic apparatus. Therefore, each energy storage unit 14 is usually matched with the electronic latching component 16 and at least one resilient component 22. Amounts and arrangement of the energy storage unit 14, the electronic latching component 16 and the resilient component 22 are not limited to the foresaid embodiment, which depends on design demand.

Figure 5:
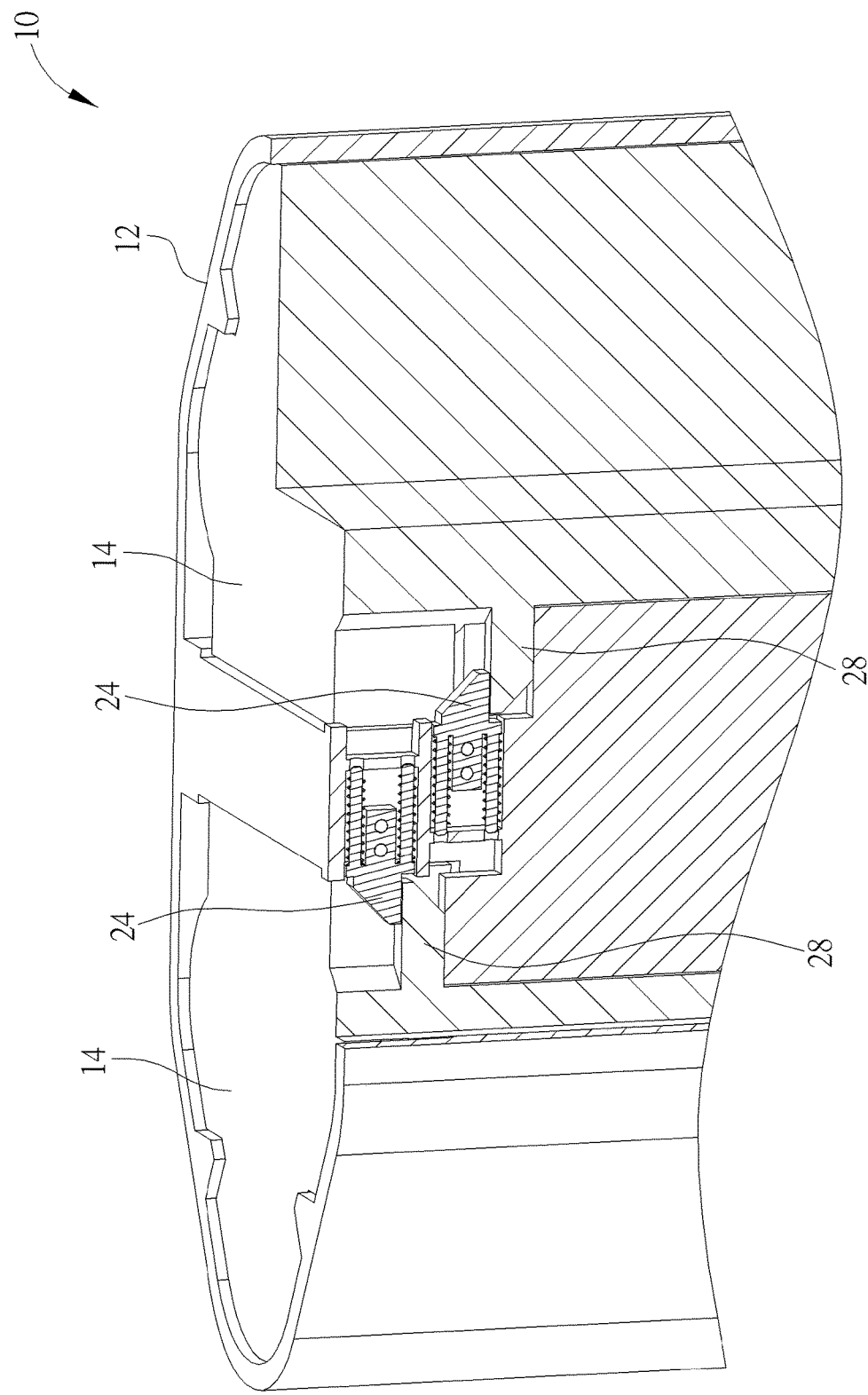
FIG. 5 to FIG. 7 respectively are sectional views of the energy storage device in different operation modes according to the embodiment of the present invention.
Figure 6:
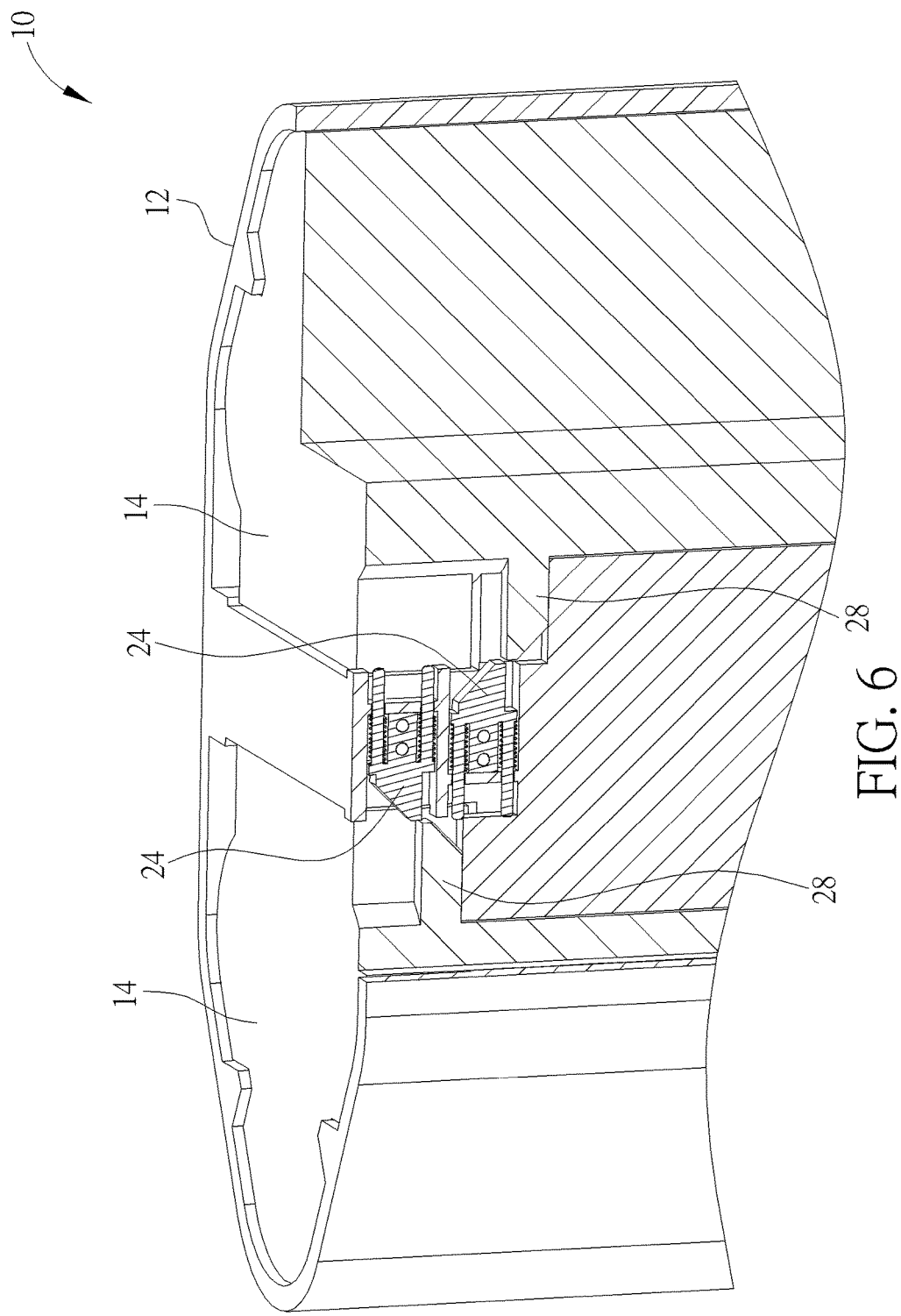
Figure 7:
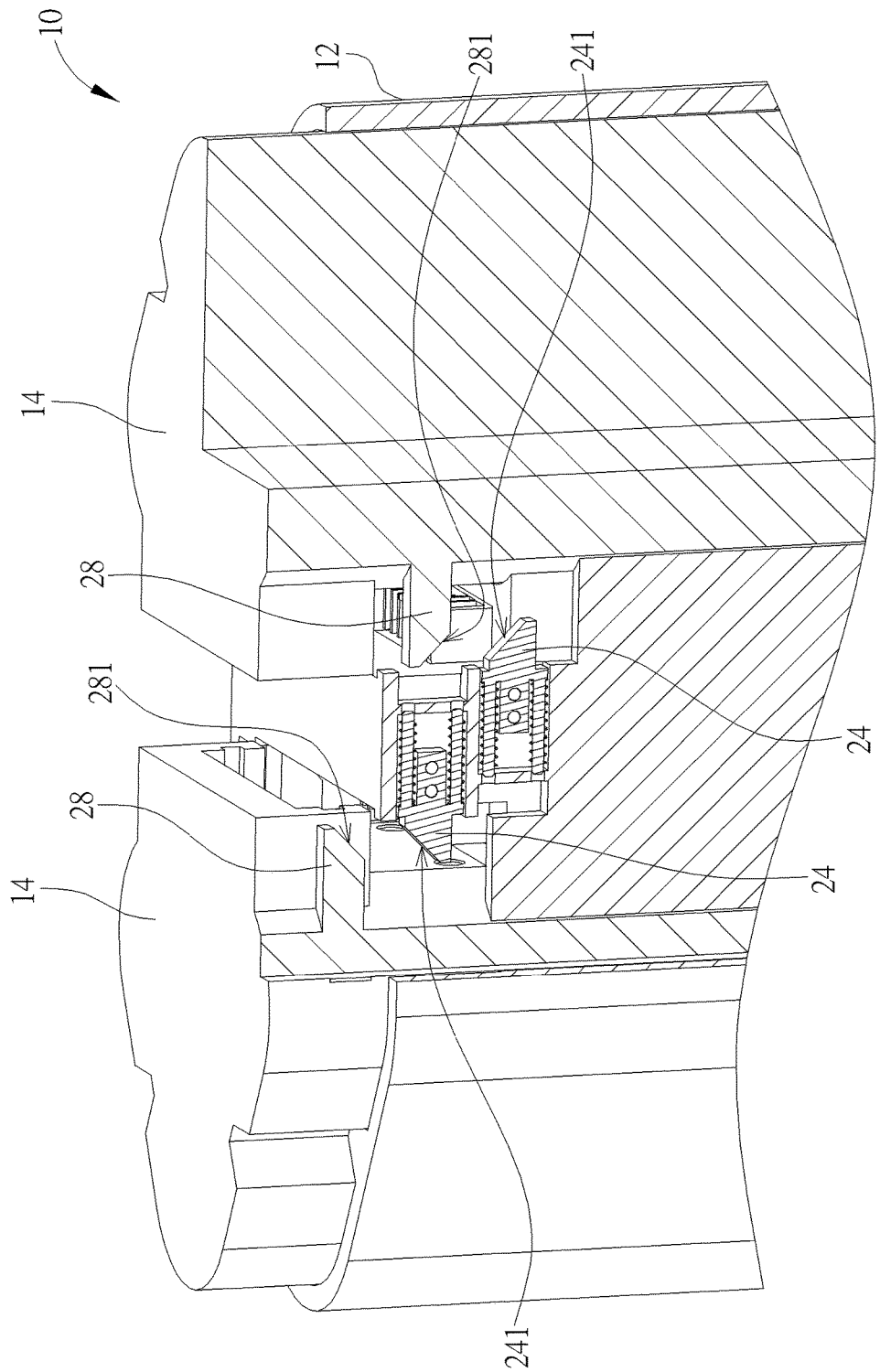

Please refer to FIG. 1, FIG. 2, and FIG. 5 to FIG. 7. FIG. 5 to FIG. 7 respectively are sectional views of the energy storage device 10 in different operation modes according to the embodiment of the present invention. The energy storage device 10 may optionally include a mechanical latching component 24 and a recovering component 26. The mechanical latching component 24 is disposed on a side of the accommodating slot 121. The mechanical latching component 24 is a secondary protective mechanism to prevent the energy storage unit 14 from being immediately pushed out of the casing 12 by the resilient component 22 while the electronic latching component 16 is disengaged from the constraining structure 20. The recovering component 26 is disposed on the mechanical latching component 24 to provide the recovery pushing force. As shown in FIG. 5, while the mechanical latching component 24 is interfered with the blocking structure 28 of the energy storage unit 14, the energy storage unit 14 cannot be removed from the accommodating slot 121. On the contrary, while the mechanical latching component 24 is manually separated from the blocking structure 28 and shifted to position shown in FIG. 6, the energy storage unit 14 can be automatically moved out of the accommodating slot 121 by the pushing force of the resilient component 22. While an external force applied to the mechanical latching component 24 is removed, the recovering component 26 can push the mechanical latching component 24 back to an original position shown in FIG. 7, the mechanical latching component 24 can be recovered to the initial mode and not interfered with the blocking structure 28, and the energy storage unit 14 can be entirely separated from the accommodating slot 121.

An external inclined surface 281 of the blocking structure 28 can press and slide relative to an inclined guiding portion 241 of the mechanical latching component 24 while the energy storage unit 14 is installed inside the accommodating slot 121, the mechanical latching component 24 is moved into the casing 12 by the pushing force, and the recovering component 26 is compressed simultaneously. While the energy storage unit 14 is stayed as an accurate position inside the accommodating slot 121, the external inclined surface 281 of the blocking structure 28 does not press the inclined guiding portion 241 of the mechanical latching component 24, and the recovery pushing force of the recovering component 26 moves the mechanical latching component 24 relative to the accommodating slot 121 to interfere the mechanical latching component 24 with the blocking structure 28, so as to ensure that the energy storage unit 14 can be stably fixed inside the accommodating slot 121.

Figure 8:
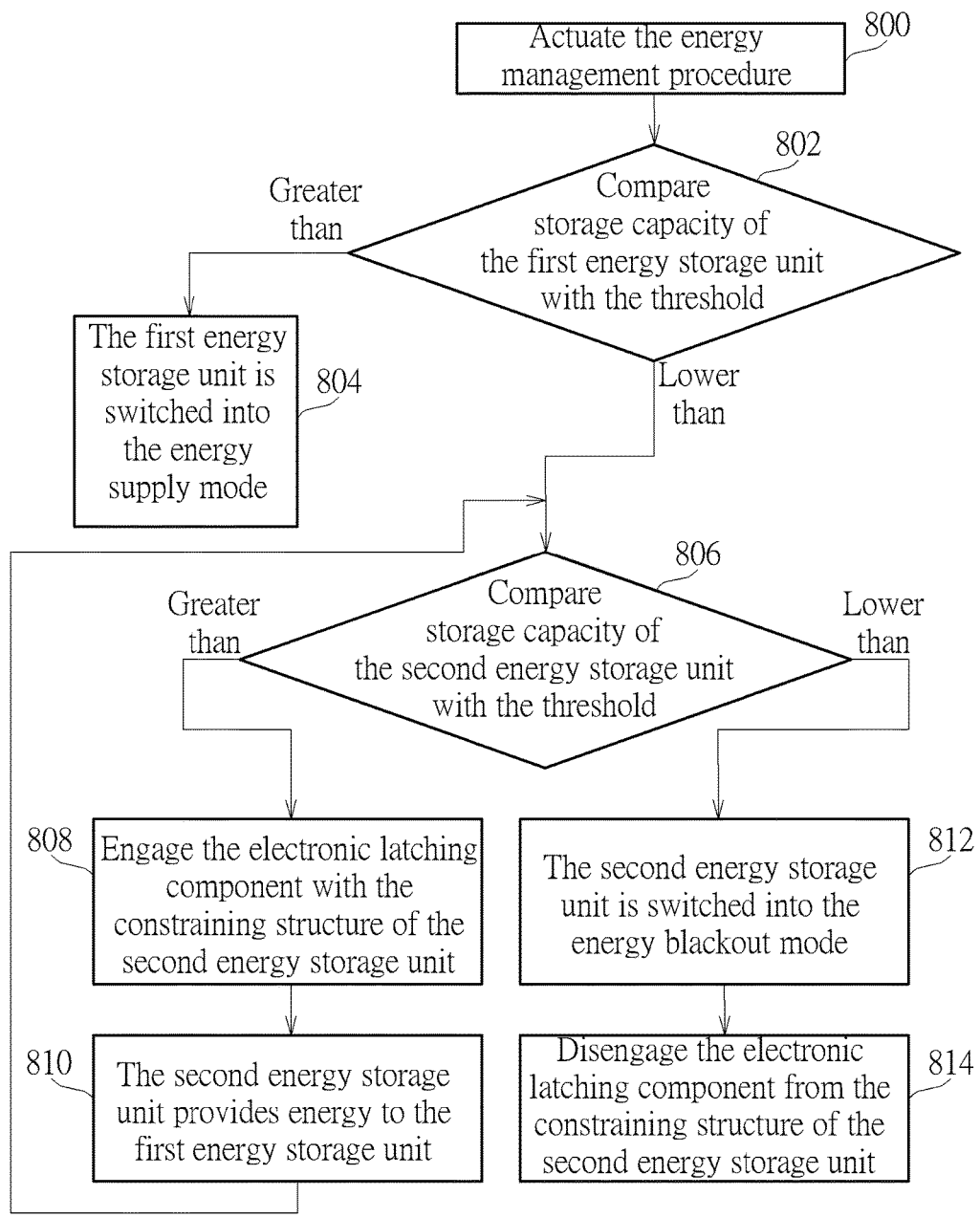
FIG. 8 is flow chart of an energy management method according to a first embodiment of the present invention.

Please refer to FIG. 8. FIG. 8 is flow chart of an energy management method according to a first embodiment of the present invention. The energy management method is suitable for the energy storage device including the non-replaceable main energy storage unit and the replaceable auxiliary energy storage unit. The energy storage unit 14 is installed inside the accommodating slot 121, and a connecting terminal 32 of the energy storage unit 14 contacts a conductive terminal 34 of the accommodating slot 121 to establish the signal transmission channel and the energy supply channel with the control unit 18. First, step 800 is executed to actuate an energy management procedure. Then, step 802 is executed that the control unit 18 detects the storage capacity of the first energy storage unit 14 (the main energy storage unit) and compares the detected storage capacity with the threshold. Step 804 is executed to switch the first energy storage unit 14 into an energy supply mode while the storage capacity of the first energy storage unit 14 is greater than the threshold, and the first energy storage unit 14 provides the energy to the portable electronic apparatus. Step 806 is executed that the control unit 18 detects the storage capacity of the second energy storage unit 14 (the auxiliary energy storage unit) and compares the detected storage capacity with the threshold while the storage capacity of the first energy storage unit 14 is lower than the threshold, so as to determine whether the first energy storage unit 14 is charged by the second energy storage unit 14.

Steps 808 and 810 are executed while the storage capacity of the second energy storage unit 14 is greater than the threshold. The control unit 18 drives the electronic latching component 16 to engage with the constraining structure 20 of the second energy storage unit 14 for fixing the second energy storage unit 14 inside the casing 12, and the control unit 18 further drives the second energy storage unit 14 to charge the first energy storage unit 14 until the first energy storage unit 14 is fully charged or the second energy storage unit 14 is exhausted. In addition, steps 812 and 814 are executed while the storage capacity of the second energy storage unit 14 is lower than the threshold. The control unit 18 switches the second energy storage unit 14 into an energy blackout mode, the second energy storage unit 14 does not provide the energy to the first energy storage unit 14, the electronic latching component 16 is driven to be disengaged from the constraining structure 20 of the second energy storage unit 14, and the second energy storage unit 14 can be freely removed out of the accommodating slot 121 while a constraint of the mechanical latching component 24 is released. The second energy storage unit 14 removed out of the accommodating slot 121 can be charged by the physical transmission cable, and then may be installed back into the casing 12 as being the auxiliary battery. In the preferred embodiment, the energy management method further may optionally include a step of determining whether the second energy storage unit 14 is set inside the casing 12 before executing step 806; the control unit 18 is utilized to detect electrical contact between the connecting terminal 32 of the second energy storage unit 14 and the conductive terminal 34 of the accommodating slot 121 for determining existence of the second energy storage unit 14, and step 806 is executed since the second energy storage unit 14 is already set inside the accommodating slot 121.

Figure 9:
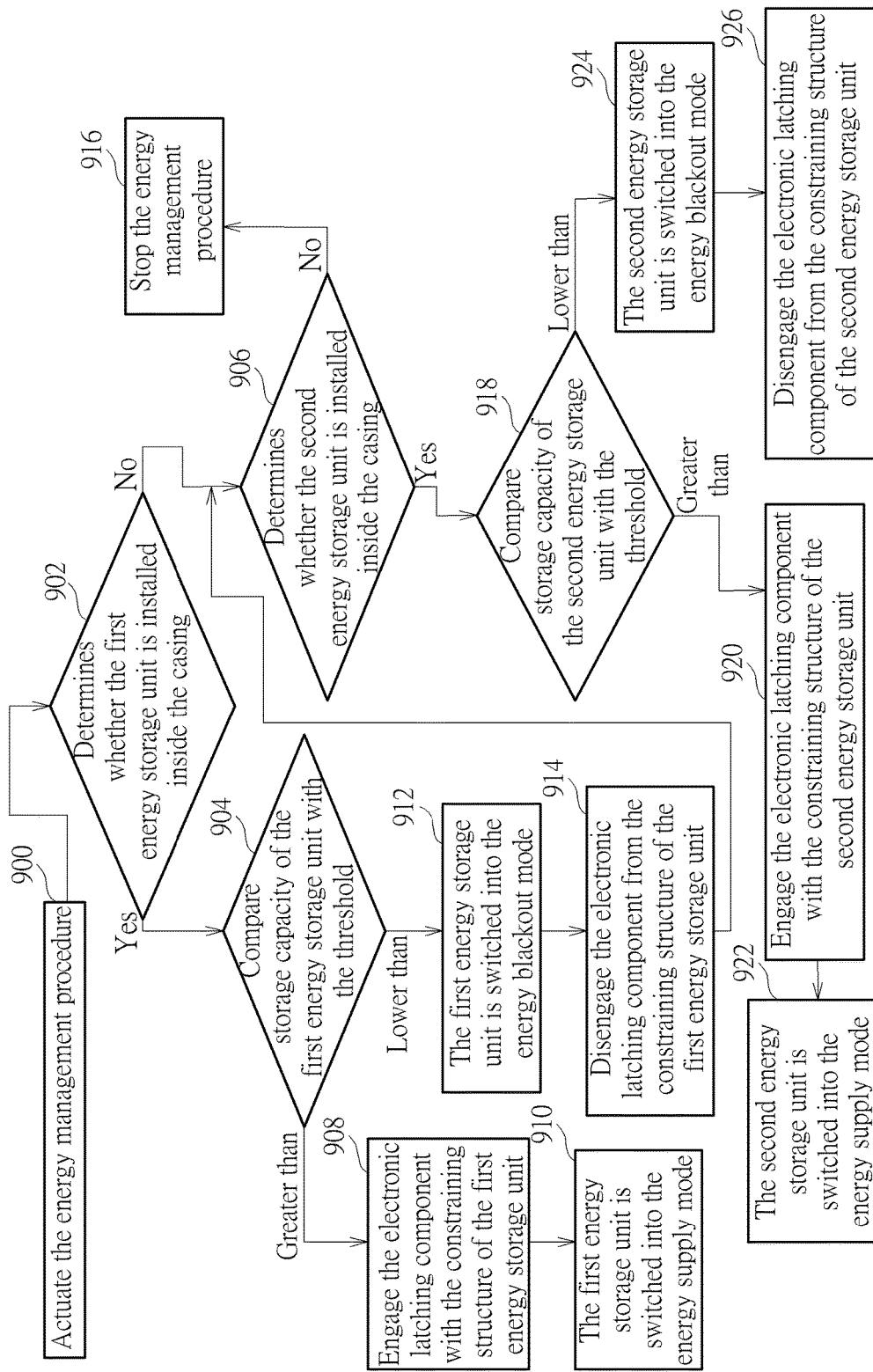
FIG. 9 is a flow chart of an energy management method according to a second embodiment of the present invention.

Please refer to FIG. 9. FIG. 9 is a flow chart of an energy management method according to a second embodiment of the present invention. The energy management method illustrated in FIG. 9 is suitable for the energy storage device 10 shown in FIG. 1 to FIG. 7, and the foresaid energy storage device includes two replaceable energy storage units for increasing stability of energy supply. First, step 900 is executed to actuate the energy management procedure, and step 902 is executed that the control unit 18 determines whether the first energy storage unit 14 (which can be represented as the main energy storage unit) is installed inside the casing 12. Step 904 is executed to detect and compare the storage capacity of the first energy storage unit 14 with the threshold while the first energy storage unit 14 is installed inside the casing 12; step 906 is executed to detect whether the second energy storage unit 14 (which can be represented as the auxiliary energy storage unit) is installed inside the casing 12 while the first energy storage unit 14 is not installed inside the casing 12. While the storage capacity of the first energy storage unit 14 is greater than the threshold, steps 908 and 910 are executed to engage the electronic latching component 16 with the constraining structure 20 of the first energy storage unit 14, and the first energy storage unit 14 is switched into the energy supply mode and provides the energy to the portable electronic apparatus accordingly. While the storage capacity of the first energy storage unit 14 is lower than the threshold, steps 912 and 914 are executed to switch the first energy storage unit 14 into the energy blackout mode, and the electronic latching component 16 is disengaged from the constraining structure 20 of the first energy storage unit 14; in the meantime, the energy management method may execute the foresaid step of determining whether the second energy storage unit 14 is set inside the casing 12, and the second energy storage unit 14 existed inside the casing 12 provides the energy to the portable electronic apparatus accordingly. Actual operation of switch between the first energy storage unit and the second energy storage unit is not limited to the above-mentioned embodiment, and depends on actual demand.

If the casing 12 does not have the second energy storage unit 14, step 916 is executed to stop the energy management procedure. If the second energy storage unit 14 is already set inside the casing 12, step 918 is executed that the control unit 18 detects the storage capacity of the second energy storage unit 14 and compares the said storage capacity with the threshold. Steps 920 and 922 are executed to engage the electronic latching component 16 with the constraining structure 20 of the second energy storage unit 14 and further to switch the second energy storage unit 14 into the energy supply mode while the storage capacity of the second energy storage unit 14 is greater than the threshold. Steps 924 and 926 are executed to switch the second energy storage unit 14 into the energy blackout mode and further to disengage the electronic latching component 16 from the constraining structure 20 of the second energy storage unit 14 while the storage capacity of the second energy storage unit 14 is lower than the threshold, and then the energy management procedure is ended.

The energy storage device of the present invention utilizes the control unit to detect and analyze the storage capacity of the energy storage unit. The electronic latching component is engaged with the energy storage unit to prevent the energy storage unit from accidental failure during energy supply process while the storage capacity is greater than the predetermined threshold. The electronic latching component is disengaged from the energy storage unit while the storage capacity is lower than the predetermined threshold, and the constraint of the mechanical latching component has to be manually released to push the energy storage unit partly out of the casing via the resilient component. The electronic latching component can be the unidirectional electromagnetic valve or the bidirectional electromagnetic valve, standards and arrangement of the electronic latching component are set in accordance with an integral structural design of the energy storage device. The mechanical latching component is the auxiliary component optionally disposed by the energy storage unit; the mechanical latching component is manipulated to separate the energy storage unit from the casing since constraint mechanism of the electronic latching component is released, to effectively avoid the energy storage unit from being separated while being charged or supplying the energy.

The energy storage device may have a plurality of energy storage units. The energy management method of the present invention can set one of the said energy storage units as the main energy storage unit, and the other energy storage units are set as the auxiliary energy storage unit. The main energy storage unit is utilized to provide the energy toward the portable electronic apparatus, and the auxiliary energy storage unit is utilized to charge the main energy storage unit while the storage capacity of the main energy storage unit is lower than the threshold. The storage capacity of the auxiliary energy storage unit is lower than the threshold, and the electronic latching component related to the auxiliary energy storage unit is released so that the auxiliary energy storage unit can be removed out of the casing for charging. Furthermore, the main energy storage unit may provide the energy to the portable electronic apparatus for a start; while the storage capacity of the main energy storage unit is lower than the threshold, the energy management method switches the energy supply from the main energy storage unit to the auxiliary energy storage unit, which means the auxiliary energy storage unit directly provides the energy to the portable electronic apparatus and the main energy storage unit with low energy can be removed out of the casing for charging.

Comparing to the prior art, the energy storage device of the present invention utilizes the new-typed energy management method to replace the energy storage unit since the portable electronic apparatus is kept in the usage mode, data operation of the portable electronic apparatus is not interrupted and a serviceable period of the portable electronic apparatus can be infinitely extended.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An energy storage device capable of increasing stability of energy supply, comprising:
   a casing, having an accommodating slot;
   at least one energy storage unit detachably disposed inside the accommodating slot, a constraining structure being disposed on an outer surface of the energy storage unit;
   at least one electronic latching component disposed on a side of the accommodating slot; and
   a control unit electrically connected to the energy storage unit and the electronic latching component, the control unit detecting storage capacity of the energy storage unit, comparing the storage capacity with a threshold, and determining whether to engage the electronic latching component with the constraining structure in accordance with a comparison result, so as to constrain a movement of the energy storage unit relative to the casing.

2. The energy storage device of claim 1, further comprising:
   at least one resilient component disposed inside the accommodating slot, an end of the resilient component being connected to the casing, and the other end of the resilient component contacting against the energy storage unit to provide potential energy of rejecting the energy storage unit out of the accommodating slot.

3. The energy storage device of claim 1, further comprising:
   at least one mechanical latching component disposed on a side of the accommodating slot and applied to interfere with a blocking structure of the energy storage unit, a movement of the energy storage unit relative to the accommodating slot being constrained by the mechanical latching component while the electronic latching component is disengaged from the constraining structure, the mechanical latching component being disengaged from the blocking structure by manual operation to allow a movement and separation of the energy storage unit relative to the accommodating slot.

4. The energy storage device of claim 3, further comprising:
   at least one recovering component disposed on the mechanical latching component and applied to generate potential energy of pushing the mechanical latching component to interfere with the blocking structure.

5. The energy storage device of claim 1, wherein the control unit drives the electronic latching component to engage with the constraining structure while the storage capacity is greater than the threshold, and drives the electronic latching component to disengage from the constraining structure while the storage capacity is lower than the threshold.

6. The energy storage device of claim 1, wherein the energy storage device further comprises a first energy storage unit and a second energy storage unit electrically connected to the control unit, and the electronic latching component is utilized to engage with the constraining structure of the second energy storage unit.

7. The energy storage device of claim 6, wherein the energy storage device is applied to an electronic apparatus, the first energy storage unit provides energy to the electronic apparatus, the control unit drives the second energy storage unit to provide the energy to the first energy storage unit while the storage capacity of the first energy storage unit is lower than the threshold, and drives the electronic latching component to disengage from the constraining structure of the second energy storage unit while the storage capacity of the second energy storage unit is lower than the threshold.

8. The energy storage device of claim 1, wherein the energy storage device further comprises a first energy storage unit and a second energy storage unit electrically connected to the control unit, and a first electronic latching component and a second electronic latching component respectively corresponding to the first energy storage unit and the second energy storage unit.

9. The energy storage device of claim 8, wherein the energy storage device is applied to an electronic apparatus, the control unit drives the first electronic latching component to disengage from the constraining structure of the first energy storage unit and switches energy supply to provide energy to the electronic apparatus by the second energy storage unit while the storage capacity of the first energy storage unit is lower than the threshold, the control unit further drives the second electronic latching component to engage with the constraining structure of the second energy storage unit while the storage capacity of the second energy storage unit is greater than the threshold.

10. An energy management method capable of increasing stability of energy supply, the energy management method being applied to an energy storage device having at least one energy storage unit and at least one electronic latching component, the energy storage unit being detachably disposed inside an accommodating slot of the energy storage device, the energy storage unit being constrained by the electronic latching component, the energy management method comprising:
  detecting storage capacity of the energy storage unit;
  comparing the storage capacity with a threshold; and
  switching the energy storage unit from an energy supply mode to an energy blackout mode and driving the electronic latching component to disengage from a constraining structure of the energy storage unit while the storage capacity is lower than the threshold.

11. The energy management method of claim 10, wherein the energy storage unit is in the energy supply mode and the electronic latching component is engaged with the constraining structure to constrain a movement of the energy storage unit while the storage capacity is greater than the threshold.

12. The energy management method of claim 10, wherein the energy storage device further utilizes a resilient recovering force of at least one resilient component to move the energy storage unit inside the accommodating slot while the electronic latching component is disengaged from the constraining structure.

13. The energy management method of claim 10, wherein the energy storage device further utilizes at least one mechanical latching component to constrain a movement of the energy storage unit inside the accommodating slot.

14. The energy management method of claim 13, wherein the energy storage device further utilizes at least one recovering component to interfere the mechanical latching component with a blocking structure of the energy storage unit.

15. The energy management method of claim 10, wherein the energy storage device further comprises a first energy storage unit and a second energy storage unit, the energy management method comprising:
  detecting storage capacity of the first energy storage unit and the second energy storage unit;
  driving the second energy storage unit to provide energy to the first energy storage unit while the storage capacity of the first energy storage unit is lower than the threshold; and
  driving the electronic latching component to disengage from the constraining structure of the second energy storage unit while the storage capacity of the second energy storage unit is lower than the threshold.

16. The energy management method of claim 15, wherein the energy storage device is applied to an electronic apparatus, the first energy storage unit directly provides the energy to the electronic apparatus, and the first energy storage unit is resupplied by the second energy storage unit.

17. The energy management method of claim 10, wherein the energy storage device further comprises a first energy storage unit and a second energy storage unit, and a first electronic latching component and a second electronic latching component respectively corresponding to the first energy storage unit and the second energy storage unit, the energy management method comprising:
  detecting storage capacity of the first energy storage unit in the energy supply mode;
  switching the first energy storage unit to the energy blackout mode, and driving the first electronic latching component to disengage from the constraining structure of the first energy storage unit to switch the second energy storage unit from the energy blackout mode to the energy supply mode while the storage capacity of the first energy storage unit is lower than the threshold; and
  driving the second electronic latching component to engage with the constraining structure of the second energy storage unit while the storage capacity of the second energy storage unit is greater than the threshold.

18. The energy management method of claim 17, wherein the energy storage device is applied to an electronic apparatus, the first energy storage unit and the second energy storage unit alternately provides energy to the electronic apparatus.

* * * * *